Patented Mar. 13, 1945

2,371,577

UNITED STATES PATENT OFFICE 2,371,577

PREPARATION OF METHYL VINYL KETONE

William J. Hale, Midland, Mich., and Leland A. Underkofler, Ames, Iowa, assignors to National Agrol Company, Inc., Washington, D. C., a corporation of Delaware No Drawing. Application December 31, 1941, Serial No. 425,184

6 Claims. (Cl. 260—596)

This invention relates to a catalytic process, and more especially to a process for preparing methyl vinyl ketone from acetyl methyl carbinol by dehydration.

Hitherto this ketone has been prepared from such products as mono-vinyl-acetylene by the addition of a molecule of water or from beta acetyl ethyl alcohol by elimination of a molecule of water, and by other processes. In these processes it has always been necessary to operate with a sufficient quantity of water to prevent rapid polymerization of resulting ketone.

One of the objects of this invention is to provide a method of dehydrating acetyl methyl carbinol to prepare methyl vinyl ketone.

Still another object of this invention is to provide a process of preparing methyl vinyl ketone from acetyl methyl carbinol in which comparatively low temperatures may be employed.

A further object of this invention is to provide a method of preparing methyl vinyl ketone in purest form from acetyl methyl carbinol by employing an especially active dehydrative catalyst.

With these and other objects in view, this invention embraces broadly the concept of preparing methyl vinyl ketone from acetyl methyl carbinol by means of a process in which comparatively low temperatures and especially active catalysts are employed.

This process is particularly designed for use in the conversion of acetyl methyl carbinol obtained by the mild oxidation of 2,3 butylene glycol which has been obtained directly from the fermentation of carbohydrates.

The process comprises passing acetyl methyl carbinol vapors, heated within a range of from 250–400° C. and preferably within a range of 300–350° C. over an especially prepared catalyst which has been heated to approximately the same temperature. The dehydration step is carried on in the presence of an inert gas such as nitrogen.

In order to obtain a maximum yield, it is necessary to use an especially selected catalyst. The catalyst used in this process is disclosed in the co-pending application of Harry Miller, Serial No. 303,168, filed November 6, 1939. This catalyst consists of a core of free metal such as aluminum, beryllium, boron, magnesium, silicon, titanium or thorium, oxidized to some extent to its corresponding oxide and impregnated on the outer surface with acidic oxide of Family A, sixth group of the periodic system of the elements, reduced in situ, and is hereinafter referred to as "metal-metal oxide-acidic oxide mass."

In general the preparation of this activated dehydrative catalyst embodies the employment of a granular metal such as aluminum, beryllium, boron, magnesium, silicon, titanium or thorium, in contact with approximately 5 to 20% its weight of tungstic acid, chromic acid or molybdic acid and the entire mass is triturated. After trituration the selected mixture is heated to approximately 600–700° C. or just under the point of endangering the reduction of the selected acidic oxide into its metal, as the catalyst will not work satisfactorily if it becomes sintered. The mass is then cooled to a temperature of about 350° C. and reduced in an atmosphere of hydrogen to effect the reduction of the catalytic mass into its more active dehydrative state. If desired, the material may be allowed to cool in a dry atmosphere to atmospheric temperature between the heating and the reducing steps, and separate apparatus for these steps may therefore be employed.

The catalytic mass formed by this process consists of non-sintered individual particles, or pellets, having exceedingly strong dehydrative properties. These particles pour freely and do not lose their original shape. Their interiors consist of a free metal with its corresponding oxide under a thin coating of a promotive oxide. For example, where aluminum has been used as the base metal and tungstic acid as the coating material, the core of the particle is metallic aluminum with an aluminum oxide outer surface in which is embedded a blue oxide of tungsten ($W_2O_5$) and aluminum tungstate.

The particular feature which distinguishes this new type of dehydrative catalyst from others heretofore known is the presence of a metallic core capable of serving as a reduction reserve for the promotive agent, thus maintaining the latter in a state of highest possible activity and thereby contributing to the masking of any dehydrogenative characteristics likely to be displayed by the basic metallic oxides present. A definite and stable equilibrium between the component parts of this improved catalytic mass is indicated by the absence of caking, disintegration and sintering through many hours of its continuous service.

In this application the term "base metal" is limited to aluminum, beryllium, boron, magnesium, silicon, titanium or thorium and their chemical equivalents, and the term "acidic metallic oxide having strong dehydrative properties" includes only the promotive reduced oxides of chromium, molybdenum, and tungsten.

Although acetyl methyl carbinol from any source may be used as the starting material in this process, this application is especially directed to the production of methyl vinyl ketone from acetyl methyl carbinol obtained by the mild oxidation, preferably with ferric chloride, of 2,3 butylene glycol obtained from the fermentation disclosed in the co-pending applications of Leo M. Christensen, Serial No. 383,051, filed March 12, 1941, and Serial No. 383,052, filed March 12, 1941. In these applications is disclosed a method of fermenting carbohydrates after inoculation with aerobacters to produce a mixture containing 2,3 butylene glycol and water. Therefore, by means of the present process a product containing only water as an impurity can be obtained from acetyl methyl carbinol produced from low priced sugar solutions.

In this connection it may be necessary to remove some of the water contained in the fermentation processes described in the above entitled applications. However, it is usually not necessary to remove more than a slight percentage of water due to the fact that the present process requires the presence of approximately 20% by weight of water to obtain a maximum yield of methyl vinyl ketone. Therefore, the residual menstruum resulting from the fermentation may be used directly in the present process after mild oxidation, without the necessity of removing more than a fraction of the water, and a starting material for the present process distilled directly therefrom. However, it is to be understood that acetyl methyl carbinol from any source may be used in the process and a high yield of methyl vinyl ketone will be produced.

In practicing the invention the selected acetyl methyl carbinol is diluted with approximately 20% of its weight of water and heated to a temperature of from 250–400° C., and preferably within a range of from 300–350° C., and these vapors together with an inert gas are then passed over the selected catalyst which has been heated to the same temperature. This temperature is maintained during the catalytic reaction.

As previously mentioned, it has been found to be preferable to conduct the dehydration within the range of from 250–400° C., and particularly within the range of from 300–350° C. Moreover, it has been found desirable to activate the catalyst by subjecting it to a stream of hydrogen before the dehydration process is started. In this connection, it should be noted that alumina or mixtures of alumina with chromic oxides or tungstic oxides may be used in the process but never give as effective a conversion as is obtained by the use of the catalyst previously described. Moreover, although the process may be carried out within the range of temperature given, it has been found that for practical purposes a temperature of approximately 300° C. is preferable under normal conditions.

If the preferred catalyst is employed, it has been found that a higher yield of methyl vinyl ketone can be obtained than is possible when ordinary catalysts are selected. In this connection experiments have shown that on the first run over the preferred catalyst, yields of methyl vinyl ketone of approximately 80–85 percent have been consistently obtained. Moreover, the end product discloses that the conversion is conducted without any trace of decomposition. The methyl vinyl ketone and the acetyl methyl carbinol unacted upon, can be readily separated from the water by salting out with potassium carbonate; or the methyl vinyl ketone may be distilled out of the mixture with steam preferably under reduced pressure.

The following examples are given to illustrate the difference between the yields obtained by use of the special catalysts and that obtained under ordinary conditions.

*Example I*

10 grams of acetyl methyl carbinol to which was added two grams of water was heated to 300° C. and passed in the presence of nitrogen over 10 grams of an aluminum oxide catalyst and held at 360° C. At the end of the first run, there was obtained in the receiver 9.4 grams of oil containing 4.9 grams of methyl vinyl ketone and 4.5 grams of acetyl methyl carbinol unacted upon. This represents a conversion of about 62% of the theoretical.

*Example II*

Under the same conditions as those described in Example I, 10 grams of acetyl methyl carbinol mixed with two grams of water were heated to 300° C. and passed over 10 grams of chromic oxide and held at 360° C. The product resulting from the first run of this mixture of the catalyst consisted of 9.2 grams of oil containing 4.2 grams of methyl vinyl ketone representing a conversion of 53% of the theoretical.

*Example III*

Under the same conditions as those described in Example I, 10 grams of acetyl methyl carbinol together with two grams of water were passed over 10 grams of a mixture of aluminum oxide and tungstic oxide, previously reduced in an atmosphere of hydrogen at 350° C. and held at this point. The oily product obtained amounted to 9.4 grams containing 5.8 grams of methyl vinyl ketone, thus representing a conversion of 73% of the theoretical.

*Example IV*

10 grams of acetyl methyl carbinol together with two grams of water were heated to 300° C. and in the presence of nitrogen passed over 10 grams of our specifically described active catalyst which here was formed of aluminum—aluminum oxide, and tungstic oxide prepared in the manner previously described and held at 300° C. The resulting oily product upon the first pass amounted to 6.5 grams of methyl vinyl ketone and 2.9 grams of unconverted acetyl methyl carbinol. This corresponds to a conversion of about 82% of the theoretical.

It is believed apparent from the above description that we have provided a process of obtaining an increased yield of methyl vinyl ketone with lowest amount of contamination by means of dehydration. It is also apparent that various changes can be made by one skilled in the art, without departing from the scope of the invention.

We claim:

1. A process for producing methyl vinyl ketone comprising heating a mixture of acetyl methyl carbinol and water to a temperature of from 250 to 400° C., passing the resulting vapors together with an inert gas over a dehydration catalyst which has been heated to a temperature of from 250 to 400° C., and maintaining this temperature during the catalytic reaction.

2. A process for producing methyl vinyl ketone comprising heating a mixture of acetyl methyl carbinol and water to a temperature of from 250 to 400° C., passing the resulting vapors together with an inert gas over a dehydration catalyst which has been heated to the same temperature, and maintaining this temperature during the catalytic reaction.

3. A process for producing methyl vinyl ketone comprising heating a mixture of acetyl methyl carbinol and water to a temperature of from 300 to 350° C., passing the resulting vapors together with an inert gas over a dehydration catalyst which has been heated to the same temperature, and maintaining this temperature during the catalytic reaction.

4. A process for producing methyl vinyl ketone comprising heating acetyl methyl carbinol diluted with approximately 20% of its weight of water to a temperature of from 250 to 400° C., passing the resulting vapors together with an inert gas over a dehydration catalyst which has been heated to the same temperature, and maintaining this temperature during the catalytic reaction.

5. A process for producing methyl vinyl ketone comprising heating acetyl methyl carbinol diluted with approximately 20% of its weight of water to a temperature of from 300 to 350° C., passing the resulting vapors together with an inert gas over a dehydration catalyst which has been heated to the same temperature, and maintaining this temperature during the catalytic reaction.

6. A process for producing methyl vinyl ketone comprising heating acetyl methyl carbinol diluted with approximately 20% of its weight of water to a temperature of from 300 to 350° C., passing the resulting vapors together with an inert gas over a dehydration catalyst which has been heated to the same temperature, and maintaining this temperature during the catalytic reaction, said catalyst comprising non-sintered particles composed of a base metal core embedded in an irregular layer of its own oxide which is coated with a reduced acidic oxide having dehydrative properties.

WILLIAM J. HALE.
LELAND A. UNDERKOFLER.